UNITED STATES PATENT OFFICE.

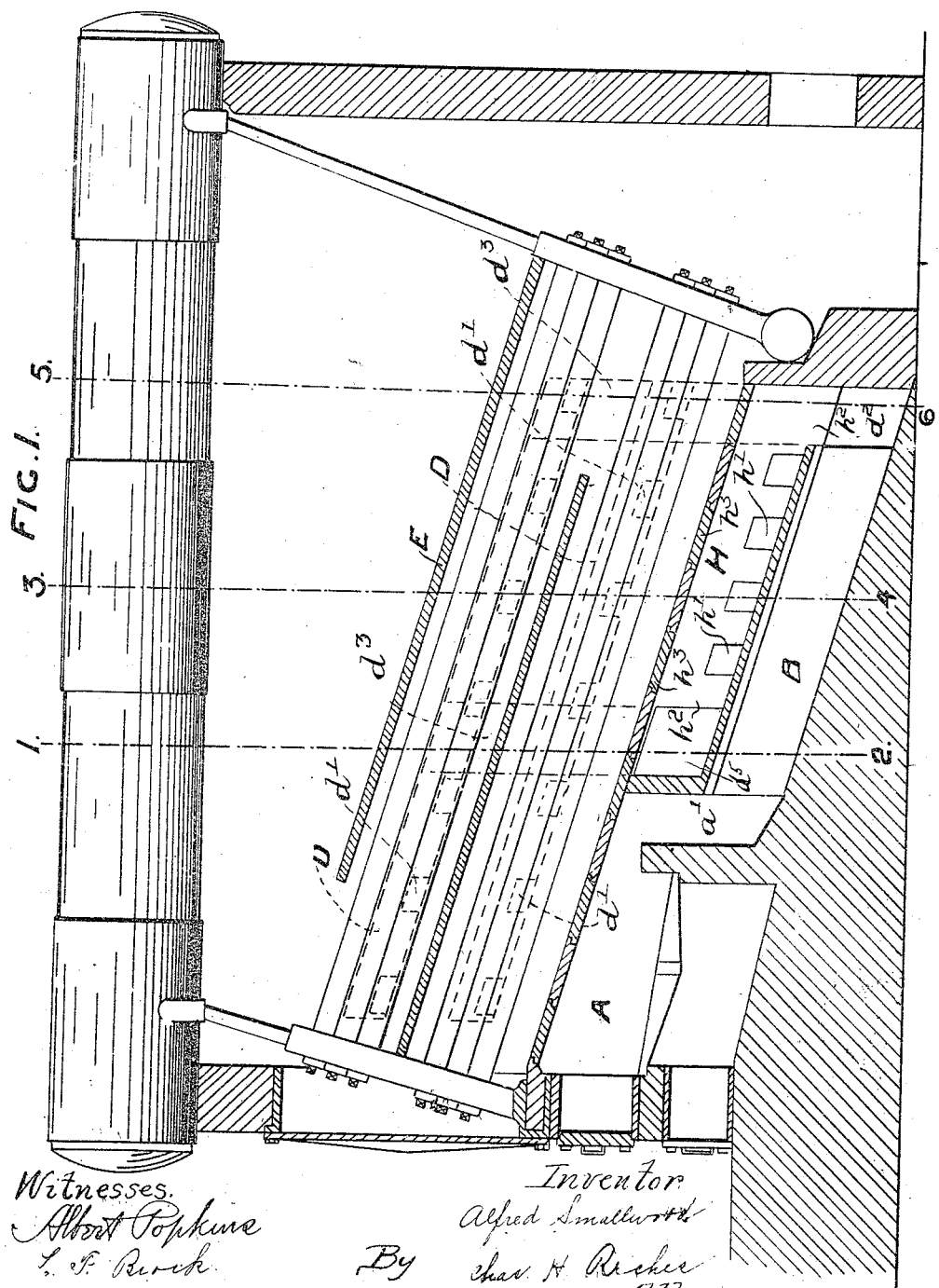

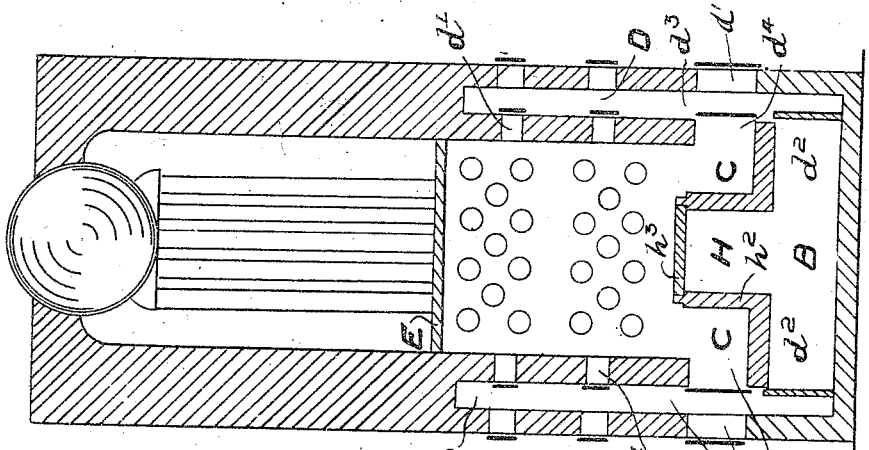
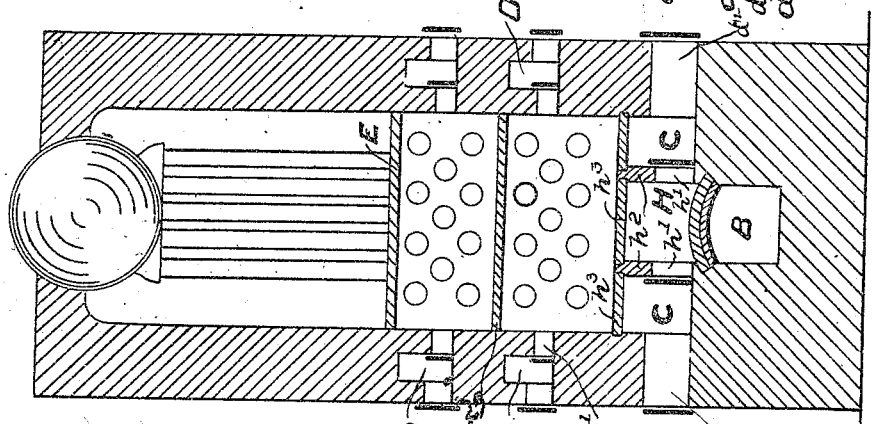
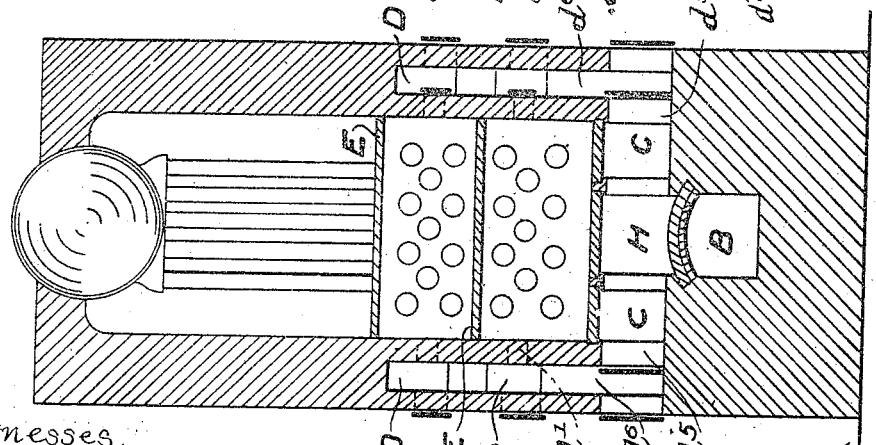

ALFRED SMALLWOOD, OF LONDON, ENGLAND.

FURNACE FOR WATER-TUBE BOILERS.

981,699.  Specification of Letters Patent.  Patented Jan. 17, 1911.

Application filed March 31, 1908. Serial No. 424,389.

*To all whom it may concern:*

Be it known that I, ALFRED SMALLWOOD, of 24 Coleman street, London, in the county of Middlesex, England, have invented certain new and useful Improvements in and Relating to Furnaces for Water-Tube Boilers; and I hereby declare that the following is a full, clear, and exact description of the same.

This invention relates to furnaces for water tube boilers, and has for its object a better and more equal distribution of the heat upon the water tubes.

By such improvements the heat is circulated and distributed around practically the whole area of the sides, floor and crown of the tube chamber, and in such a manner that the heated gases are evenly distributed over the water tubes, the water tubes being arranged as usual within the tube chamber to which the heat of one or more furnaces is supplied. The foundation of the furnace or furnaces may be solid throughout and free of any arching or chambers and the floor of the tube chamber may be supported upon a series of longitudinal divisions formed of blocks of fire clay or the like in such a manner as to form a series of conduits under the floor and through which the heated gases circulate as hereinafter described.

The furnace has a horizontal combustion chamber continued for the full length of the boiler, and connected with side conduits under the floor of the tube chamber at the furnace chamber end or by a series of apertures whereby the gases pass from the combustion chamber to the side conduits intermediate its ends, the gases then passing from the side conduits, into heat chambers in the outer walls of the boiler casing, the gases passing from the heat chambers to the tube chamber where they are distributed against the water tubes, and from the tube chamber to the stack.

Provision is made by which a portion of the gases from the combustion chamber and side conduits may be allowed to enter the tube chamber at or near one or both ends of the water tubes, this being conveniently effected by making several of the end slabs to slide in their rabbets and providing apertures having doors at the ends of the furnace whereby the position of such slabs can be opened and closed or adjusted to allow more or less of the gases to enter the tube chamber at that point.

In order that this invention may be clearly understood and more easily carried into practice reference may be had to the appended explanatory two sheets of drawings, on which:

Figure 1, is a diagrammatic sectional side elevation of a Babcock and Wilcox type of water tube boiler constructed in accordance with one form of the present invention. Fig. 2, is a sectional front elevation of the boiler illustrated in Fig. 1, the plane of section being on the line 1—2 thereof. Fig. 3, is a sectional front elevation of the boiler illustrated in Fig. 1, the plane of section being on the line 3—4 thereof. Fig. 4, is a sectional front elevation of the boiler illustrated in Fig. 1, the plane of section being on the line 5—6 looking toward the rear thereof.

The drawings demonstrate one method of carrying the present invention into effect in which a single furnace chamber A is employed and in operation the furnace gases descend the flue $a'$ into the longitudinal combustion chamber B and thence pass into and backwardly along the heat flue H which in turn leads into the side flues C at the furnace chamber end of the boiler. In cases in which the three flues are employed as illustrated, damper controlled apertures $h'$ may be provided and adapted for communication with the side flues thereby affording a more even temperature. One or more horizontal or inclined flues D may be arranged in each side wall of the boiler and provided with a series of damper controlled apertures $d'$ opening into the tube chamber, and the said flues may communicate with the flues below the floor at either extremity.

In the drawings provision is also illustrated whereby the gases from the combustion chamber B may be led directly into the flues D this being through the medium of a transverse flue $d^2$ at the back end of the furnace, the said flue leading into the side flues by uptakes $d^3$. After traversing the central flue H and side flues C, the gases may be introduced into the flues D by the uptakes $d^3$ through the medium of damper controlled apertures $d^4$, or the gases may be introduced into the flues D directly from the central flue H by the damper controlled apertures $d^5$, these leading into the flues D at an approximately central position by the uptakes $d^6$. The divisions $h^2$ forming the flues C H, are adpted to support the floor of the tube chamber, such floor being constructed wholly or in part of fire clay slabs $h^3$ certain or all of which may be removable to provide for the introduction of gases to the tubes direct from either or both of the flues C, H, at any desired position in their length.

The combustion and ignition of the gases is assisted in their passage through the conduits by the intensity of heat contained in the slabs and divisions assisted as required by the admission of fresh air to the conduits, through the damper controlled openings $d^{10}$, combustion being also assisted by the admission of fresh air, preferably heated, to suitable parts of the combustion chamber through the damper controlled openings $d^{12}$. The passage of gases introduced into the tube chamber is baffled by partitions such as E by which the draft is directed efficiently around the tubes of the boiler in its passage from the floor or side flues to the stack.

It will be obvious that the construction and mode of operation aforedescribed may be modified without departing from the invention and that numerous variations may be employed to effect the requisite distribution of the heat in each particular type of boiler to which the invention is applicable.

Having thus fully described my invention what I claim as new and desire to secure by Letters Patent is:

1. A furnace for a water tube boiler comprising a fire chamber, said furnace having a combustion chamber extending lengthwise of the furnace and in rear of and communicating with the fire chamber, a central heat flue above and communicating with the combustion chamber, conduits at the sides of the central heat flue and connected therewith, heat chambers in the sides of the furnace, and vertical flues connecting the heat chambers with the combustion chamber and heat flue and conduits.

2. A furnace for a water tube boiler comprising a fire chamber, said furnace having a combustion chamber in rear of and connected with the fire chamber, a heat flue above and connected with the combustion chamber, heat conduits at the sides of the heat flue and connected therewith, a boiler chamber, a floor for the boiler chamber, and heat chambers at the sides of the boiler chamber connected with the heat flue and conduits and provided with openings into the boiler chamber above the floor.

3. A furnace for a water tube boiler comprising a fire chamber, said furnace having a combustion chamber in rear of and connected with the fire chamber, a heat flue above and connected with the combustion chamber, heat conduits at the sides of the heat flue and connected therewith, a boiler chamber, a floor for the boiler chamber, heat chambers at the sides of the boiler chamber connected with the heat flue and conduits and provided with openings into the boiler chamber above the floor, and baffles within the boiler chamber.

In witness whereof I have hereunto set my hand in the presence of two witnesses.

ALFRED SMALLWOOD.

Witnesses:
WALTER H. E. BARTLAM,
ARTHUR H. BROWN.